United States Patent [19]

Evers et al.

[11] Patent Number: 4,630,334
[45] Date of Patent: Dec. 23, 1986

[54] DEVICE FOR ALIGNING FISH

[75] Inventors: Reinhard Evers, Stockelsdorf; Werner Wenzel, Lübeck, both of Fed. Rep. of Germany

[73] Assignee: Nordischer Maschinenbau Rud., Fed. Rep. of Germany

[21] Appl. No.: 666,504

[22] Filed: Oct. 30, 1984

[30] Foreign Application Priority Data

Nov. 2, 1983 [DE] Fed. Rep. of Germany ....... 3339631

[51] Int. Cl.$^4$ ............................................. A22C 25/08
[52] U.S. Cl. ............................................ 17/56; 17/61
[58] Field of Search ................... 17/57, 55, 24, 56, 61

[56] References Cited

U.S. PATENT DOCUMENTS 1,709,362  4/1929  Meissner et al. ........................ 17/57
4,172,304  10/1979  Markov et al. ......................... 17/56

FOREIGN PATENT DOCUMENTS 0097124  4/1973  German Democratic Rep. .... 17/57

Primary Examiner—Willie G. Abercrombie
Attorney, Agent, or Firm—Thomas R. Morrison

[57] ABSTRACT

The invention concerns a feeding aid helping the manual feeding of fish processing machines, especially those for the processing of flat fish. The aid is suitable to be used on machines which have a vertical feeding shaft receiving the flat fish respectively their rumps and comprises a cover arranged above the feeding shaft and to be folded upwards, on which cover guiding plates extending into the feeding shaft are arranged. These guiding plates oppose each other V-shaped and are pivotal against the force of a spring about their longitudinal edges facing each other, the displacement occurring by each fish arriving in the feeding shaft and thereby effecting an adaptation of the V-shaped angle to the cross sectional shape of the fish.

5 Claims, 2 Drawing Figures

DEVICE FOR ALIGNING FISH

BACKGROUND OF THE INVENTION

1. Field of the Invention

The invention concerns a device for aligning fish resp. fish rumps in particular of flat fish, for feeding of the same into fish processing machines in proper position, the device comprising a feeding shaft or channel receiving the fish resp. the fish rump in vertical alignment, which shaft or channel comprises guiding elements limiting it and being synchronously displaceable in pairs by the fish against the force of a spring, and the device further comprising a conveyor for the fish effective in the feeding shaft as well as a feeding chute ending in the region of an insertion channel.

2. Description of Prior Art

With the high capacity of modern fish processing machines special attention is to be paid to the ergonomic form of the operating place. This is of even more importance in a machine of the above-mentioned constructional characteristics, since the working quality of the operator forms an essential object in determining the economy of the machine. This has its origin in that the flat fish to be processed resp. their rumps must be fed singly by the operator under a certain pre-alignment in order to safeguard a perfect cutting result.

3. Object of the Invention

It is therefore an essential object of the invention to suggest a device with whose help a far-reaching relief of the operator with respect to the necessary care in inserting the flat fish can be achieved.

SUMMARY OF THE INVENTION

In an aligning device comprising a feeding shaft having guide elements which form bordering limitations and are displaceable synchronously in pairs by the fish against spring force, a conveyor for the fish effective in the feeding shaft, and a feeding chute ending in the region of an insertion channel, this object is achieved according to the invention in that a pair of guiding plates facing each other V-shaped and extending into the feeding shaft under symmetrical arrangement with respect to the longitudinal center are provided which are pivotal about axes lying essentially flush with their longitudinal edges facing each other, their V-shaped angle opening towards the feeding chute.

The advantages thus achieved consist especially in that the flat fish need only be guided with pre-alignment according to their head-tail position, since the V-shaped position of the guiding plates performs the centering of the flat fish in a manner that the longitudinal axis of the fish and the machine axis correspond with each other. A further advantage results from the fact that due to the displaceability of the guiding plates with increasing introduction an adaptation of the V-shaped angle opening between these plates to the body cross section of each flat fish passing occurs.

In order to safeguard the alignment of the fish until it is taken over by the conveyor, the guiding plates may preferably extend up to near the conveyor.

According to an advantageous embodiment of the device according to the invention it is provided that mounting means receiving the named axes are arranged on a cover covering the feeding chute in the region of the feeding shaft. Expediently the cover can be arranged to be swivelled upwards and designed to be effective on an electric switch bringing the machine to a standstill in an upward swivel position. Thereby a non-dangerous action or manipulation is made possible in the case of an interruption e.g. by a jam of the feeding shaft.

BRIEF DESCRIPTION OF THE DRAWINGS

Other and further objects of the present invention will be apparent from the following description and claims and are illustrated in the accompanying drawings, which by way of illustration schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. In the drawings

DESCRIPTION OF THE PREFERRED EMBODIMENT

Figure 1:
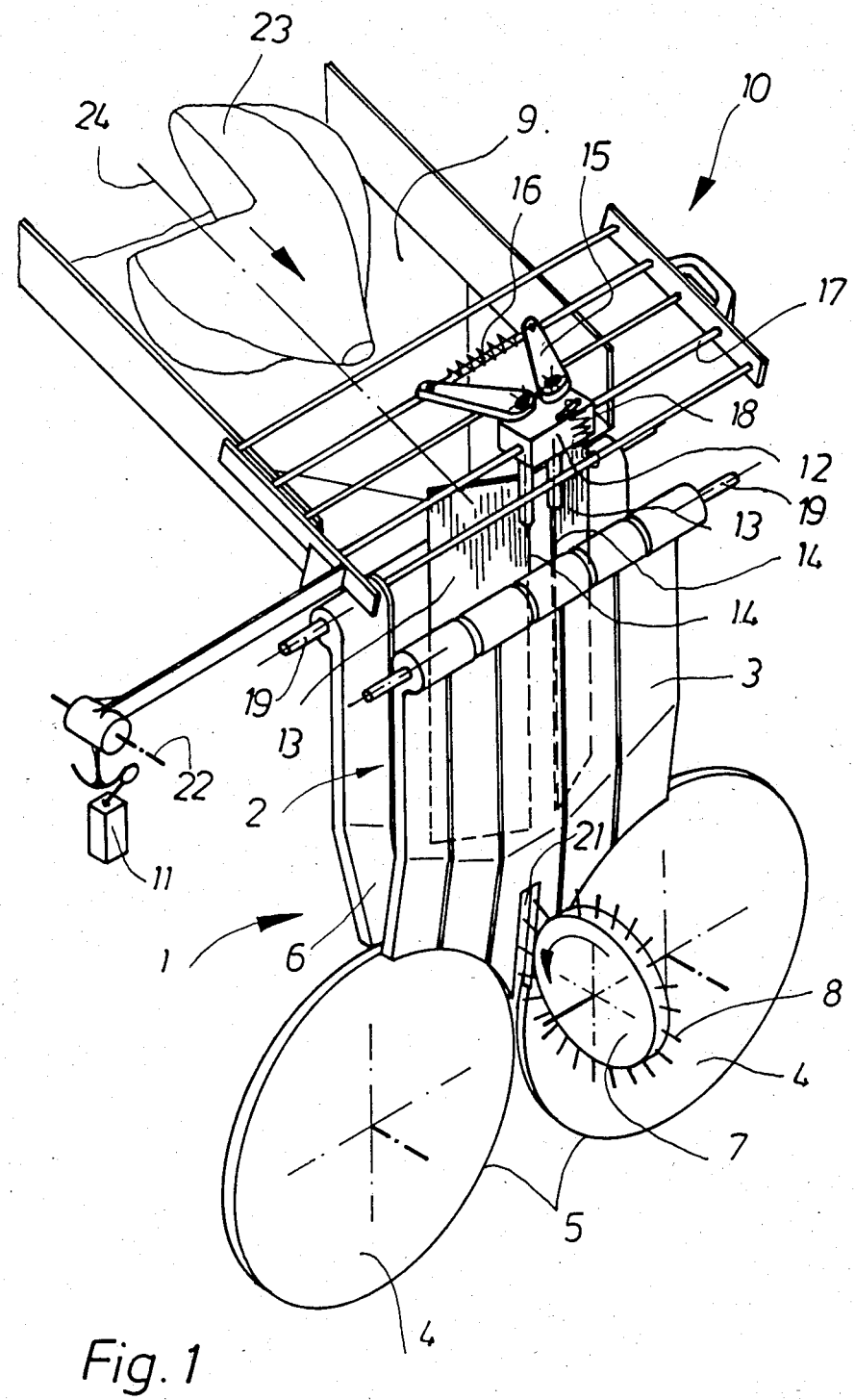
FIG. 1 shows a simplified partial view of the whole device in axonometric representation.
Figure 2:
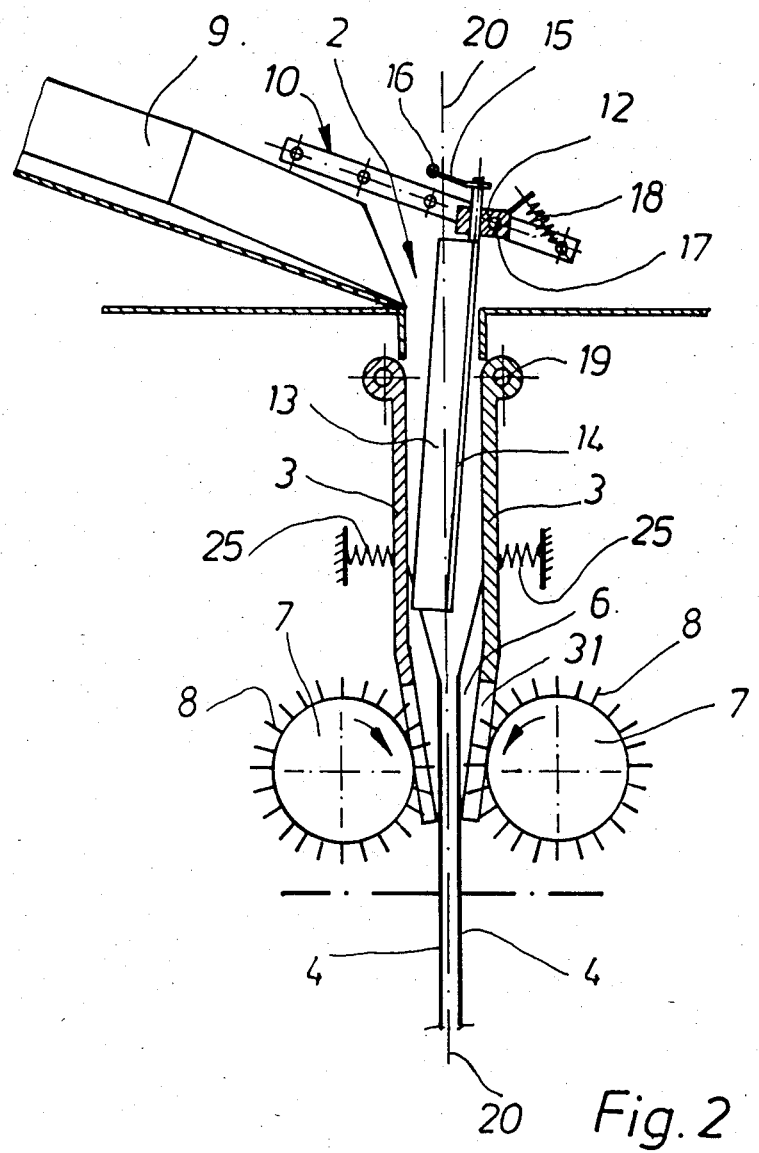
FIG. 2 shows a cross-section of the machine of FIG. 1, taken along the longitudinal axis thereof.

A rectangular feeding shaft or channel 2 is arranged in a not shown frame of a flat fish filletting machine 1 arranged for the vertical feeding of the fish. The feeding shaft 2 is bordered by guiding elements 3 arranged in pairs opposite each other and mounted on pivot rods 19 so as to be displaced resiliently against the force of springs 25 (FIG. 2). At their lower ends the guiding elements 3 are adapted to the periphery of two pairs of circular knives 4, which are arranged symmetrically to the plane of a central longitudinal axis 20 (FIG. 2) of the feeding shaft 2, their cutting edges 5 opposing each other almost touching each other on either side of said central longitudinal axis 20. The guiding elements 3 are deformed in their lower region in such a manner that at the periphery of the circular knives 4 they leave a narrow gap 6 running towards the plane of the longitudinal axis 20 of the feeding shaft 2. The guiding elements 3 forming the middle pair are each provided with a vertical slit 21 at their lower end, through which slit 21 a conveyor 7 provided with spikes 8 grips. A feeding chute 9 with channel shaped bottom is positioned in front of the feeding shaft 2. The feeding shaft 2 and therefore the region of the mouth of the feeding chute 9 is covered by a cover 10 which is arranged to be folded or swivelled upwardly about a pivot axis 22 (FIG. 1) in the frame of filleting machine 1, and to cooperate with a switch 11. The cover 10 carries a mounting block 12 for a pair of guiding plates 13 which are arranged symmetrically to the longitudinal axis 20 extending into the feeding shaft 2 and opening towards the feeding chute 9 at a V-shaped angle. The mounting block 12 enables the guiding plates 13 to swivel about longitudinal edges 14 thereof facing each other, both swivel axes being provided with cranks 15 which are held under tension with each other by a spring 16. The mounting 12 is additionally pivotable about an axis 17 extending transverse to the longitudinal axis 20, a spring 18 biasing the guiding plates 13 against the feeding direction of the fish.

The method of operation of the device is the following:

The rump 23 of a flat fish to be processed is guided preferably tail end first via the inclined feeding chute 9 to the feeding opening of the feeding shaft 2, a rough pre-alignment of the longitudinal axis of the fish in accordance with the central longitudinal axis 24 of the feeding chute 9 occurring due to the channel-shaped form of the bottom of the feeding chute 9. On reaching the feeding opening the tail end arrives in the V-shaped angle formed by the guiding plates 13 so that the fish rump 23 is centered. Due to the obtuse angled position between the feeding chute 9 and the guiding plates 13 a deflection of the tail end into the feeding shaft 2 occurs, the kinetic energy of the fish rump effecting that the guiding plates 13 are pivoted about the axis 17 against the spring 18 until they contact the inner side of the guiding elements 3. In the further course of the sliding down of the fish rump into the feeding shaft 2 the fish rump comes to contact the guiding plates 13 increasingly with its whole body surface, so that an adaptation of the V-position of the guiding plates 13 to the contacting surface curving occurs by displacement. Thus the fish rump slides down the feeding shaft 2 under central alignment of its longitudinal axis and is finally seized by the conveyor 7. The conveyor now affects that the fish rump is pulled into the gap 6, which adapts itself to the cross section shape of the fish rump by displacement of the guiding elements 3, so that the pairs of circular knives 4 arranged beneath are able to cut on both sides of the bones. In that process the cuts finish near the backbone due to the aligning effect of the guiding plates 13. In the case of an obstruction or jamming of the feeding shaft 2 the guiding plates 13 can be swung out of the feeding shaft 2 by upward pivoting of the cover 10 about pivot axis 22, on which cover 10 the mounting block 12 for the guiding plates 13 is positioned. In this process the machine is stopped by means of the switch 11 so that it is possible to reach into the feeding shaft 2 by hand without any danger of injury.

What is claimed is:

1. A device for aligning the rumps of fish, particularly flat fish, and for feeding the same into a fish processing machine in aligned position, said device comprising:
   a. feeding chute means for receiving said fish rumps in aligned head-tail orientation with respect to their longitudinal axes, and for pre-aligning said fish rumps in approximate alignment with the central longitudinal axis of said feeding chute means;
   b. feeding shaft means disposed substantially vertically and communicating with the downstream end of said feeding chute means for receiving said pre-aligned fish rumps from the latter, said feeding shaft means having a central longitudinal axis aligned with the central longitudinal axis of said feeding chute means, and including depending guiding elements forming borders of said feeding shaft means, said guiding elements being movably mounted for synchronous and resilient displacement in pairs in response to engagement by said fish rumps;
   c. conveyor means communicating with the interior of said feeding shaft means for conveying said fish rumps outwardly thereof;
   d. guiding plate means including a pair of depending guiding plates terminating in longitudinal edges; and
   e. mounting means pivotally mounting said guiding plates along said longitudinal edges with one longitudinal edge of one guiding plate extending parallel and proximate to one longitudinal edge of the other guiding plate and with said guiding plates being arranged in V-shaped formation opening towards said guiding chute means;
   said guiding plates extending downwardly within said feeding shaft means with said guiding plates located symmetrically on either side of said central longitudinal axis of said feeding shaft means, said guiding plates being mounted to pivot resiliently about the axes of their proximate longitudinal edges under contact of the fish rumps passing through said feeding shaft means, thereby increasing the included angle of said V-shaped formation;
   whereby said guiding plates center said fish rumps with their longitudinal axes aligned with the central longitudinal axis of said feeding shaft for delivery to said conveyor means.

2. A device as claimed in claim 1, wherein said guiding plate means extends downwardly to a point proximate to said conveyor means.

3. A device as claimed in claim 1, wherein said mounting means is supported on cover means covering said feeding shaft means in the region of said feeding chute means.

4. A device as claimed in claim 3, wherein said cover means is mounted for upward swivelling movement.

5. A device as claimed in claim 4, wherein said cover means is operatively coupled to electrical switch means for deengergizing said fish processing machine when said cover means is swivelled upwardly.

* * * * *